United States Patent

[11] 3,575,475

| [72] | Inventor | Donald R. Boerner<br>Wayne, N.J. |
|---|---|---|
| [21] | Appl. No. | 829,958 |
| [22] | Filed | June 3, 1969 |
| [45] | Patented | Apr. 20, 1971 |
| [73] | Assignee | Singer-General Precision, Inc.<br>Little Falls, N.J. |

[54] FLEXURE JOINT
4 Claims, 2 Drawing Figs.

[52] U.S. Cl. .................................................. 308/2, 74/5,
287/85
[51] Int. Cl. ..................................................... F16c 11/12
[50] Field of Search ........................................... 308/2; 74/5;
64/11, 15, 18; 287/85

[56] References Cited
UNITED STATES PATENTS

| 2,937,053 | 5/1960 | Rigney | 308/2 |
| 2,960,302 | 11/1960 | Brown | 308/2 |
| 3,384,424 | 5/1968 | Raines | 308/2 |
| 3,394,970 | 7/1968 | Tracy | 308/2 |
| 3,420,582 | 1/1969 | Shelley | 308/2 |

Primary Examiner—Manuel A. Antonakas
Attorneys—S. A. Giarratana and S. M. Bender ABSTRACT: A flexure joint in which at least one pair of slots extend through the wall of a unitary hollow cylindrical member, the ends of one slot of each pair terminating a predetermined circumferential distance from the corresponding ends of the other slot of the same pair to form at least two flexure portions between the corresponding ends. Each flexure portion is formed by two flexure leaves, the longitudinal axes of which extend at an angle to each other.

PATENTED APR 20 1971　　　　　　　　　　　　3,575,475

INVENTOR.
DONALD R. BOERNER
BY
S. A. Giarratana
ATTORNEYS

3,575,475

FLEXURE JOINT

BACKGROUND OF THE INVENTION

This invention relates to a flexure joint, and, more particularly, to a single-piece flexure joint permitting a universal-type joint connection between two members.

There are many well-established needs for a high-precision, universal-type, joint connection. For example, in arrangements utilizing a high-speed rotating member, such as a flywheel, which is connected to its drive shaft by means of a universal joint connection to form an effective gyroscope, the joint connection must be extremely precise, yet rugged and dependable.

In these type arrangements, it has been suggested to manufacture the joint connection from two separate two-axis flexures, one with four flexure hinges extending parallel to the longitudinal axis of the flexure assembly for axial strength, and one with four flexure hinges perpendicular to the longitudinal axis for torsional strength. These two flexures are joined together by cementing, welding, or the like, while maintaining the flexure axes of one flexure coincident with those of the other, plus producing an assembly with the desired properties of axial and torsional strength. The disadvantages of this type of connection are that two parts must be fabricated and assembled, which increases the cost of the assembly. Also, the alignment of the axes of the two flexures during assembly is a possible source of error, which can result in flexure spring rates extending out of the desired specified limits, as well as high flexure stresses which can reduce the life of the flexure assembly. Further the axial flexure is particularly susceptible to damage due to angular deflections beyond a safe limit before assembly with the torsional flexure. Still further, the assembly operation necessary to produce the complete flexure also exposes the various components to possible damage.

SUMMARY OF THE INVENTION

It is therefore an object of the present invention to provide a single-piece two-axis flexure joint which is relatively inexpensive to manufacture, yet is extremely precise.

Briefly summarized, the flexure joint of the present invention comprises a unitary hollow cylindrical member having at least one pair of slots extending through the wall thereof, the ends of one slot of each pair terminating a predetermined circumferential distance from the corresponding ends of the other slots of the same pair to form at least two flexure portions between the corresponding ends, each flexure portion being formed of two flexure leaves, the longitudinal axes of which extend at an angle to each other.

BRIEF DESCRIPTION OF THE DRAWINGS

Reference is now made to the accompanying drawings for a better understanding of the nature and objects of the flexure joint of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
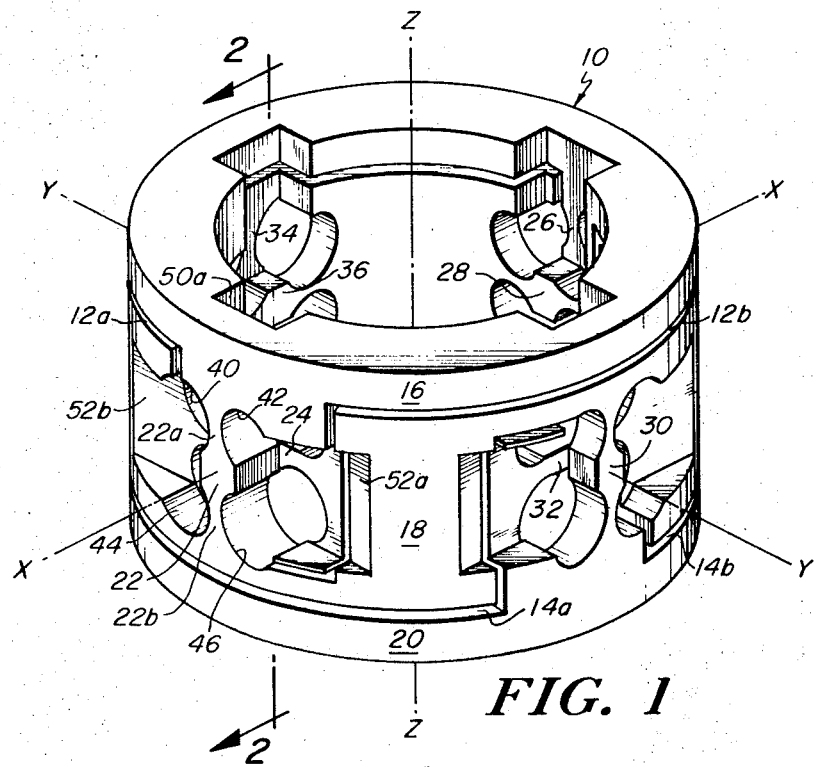
FIG. 1 is a perspective view of the flexure joint of the present invention.
Figure 2:
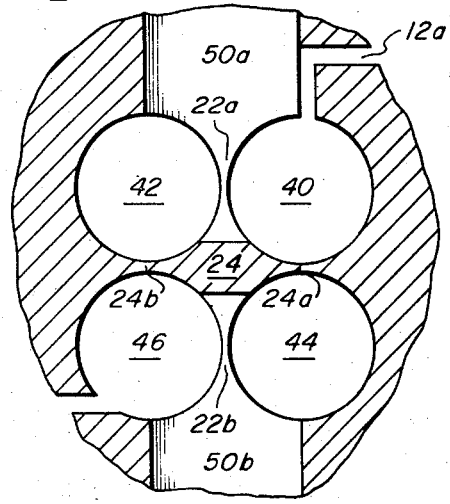
FIG. 2 is a partial section view taken along the line 2–2 of FIG. 1.

As shown in FIGS. 1 and 2 of the drawings, the flexure joint of the present invention is formed from a right hollow cylinder 10 having a longitudinal axis Z–Z. A first pair of circumferential slots 12a and 12b extend through the wall of the cylinder 10, and are axially spaced from a second pair of circumferential slots 14a and 14b to form three gimbal portions 16, 18, and 20 which are adapted to flex with respect to each other about two perpendicular flexure axes X–X and Y–Y, both of which lie in the same plane perpendicular to the longitudinal axis Z–Z. The slots of each pair extend substantially around the circumference of the cylinder 10 in a plane perpendicular to the longitudinal axis Z–Z, with the end portions of the slots extending a short axial distance. The ends of one slot of each pair terminate a predetermined circumferential distance from the corresponding ends of the other slot of the same pair to form two flexure portions between the corresponding ends. For example, the ends of the slots 12a and 12b, depicted generally in the front portion of the cylinder in FIG. 1, are spaced apart a predetermined distance to define a flexure portion, formed essentially of two flexure leaves 22 and 24. The longitudinal axes of the leaves 22 and 24 extend perpendicular to each other, the longitudinal axis of the leaf 22 extending parallel to the longitudinal axis Z–Z of the cylinder 10, and the longitudinal axis of the leaf 24 extending perpendicular to the axis Z–Z, or parallel to the flexure axis Y–Y.

Similarly, a pair of flexure leaves 26 and 28 are formed between the other ends of the slots 12a and 12b, a pair of flexure leaves 30 and 32 are formed between two adjacent ends of the slots 14a and 14b, and a pair of flexure leaves 34 and 36 are formed between the other ends of the latter slots. The longitudinal axis of the leaves 26, 30, and 34 also extend parallel to the longitudinal axis Z–Z, the longitudinal axis of the leaf 28 also extends parallel to the flexure axis Y–Y, while the longitudinal axes of the leaves 32 and 36 extend parallel to the flexure axis X–X.

It is noted that each of the slots of each pair overlaps a flexure portion formed between the slots of the other pair. For example, the slot 14a overlaps the flexure leaves 22 and 24 formed between the ends of the slots 12a and 12b.

Each flexure leaf has two flex hinges, or necked down portions connected in series. For example, the leaf 22 has two necked down portions 22a and 22b, as shown in FIG. 1.

In the above manner, each flexure axis is comprised of two sets of two flexure leaves operating in parallel, each leaf in the flexure consisting of two necked down portions connected in series. By this arrangement, the leaves 22, 26, 30 and 34 together impart an axial strength to the flexure, while the leaves 24, 28, 32 and 36 together impart a torsional strength. Also, the leaves 22, 24, 26 and 28 permit the gimbal 16 to flex with respect to the gimbal 18 about axis X–X, while the leaves 30, 32, 34 and 36 permit the gimbal 18 to flex with respect to the gimbal 20 about the axis Y–Y.

The manner in which the flexure joint of the present invention is formed will be described in connection with the flexure portion formed by the leaves 22 and 24, it being understood that the remaining three flexure portions are formed in exactly the same manner. Four holes 40, 42, 44 and 46 are initially drilled though the wall of the cylinder 10, the spacing between the adjacent holes corresponding to the width of the necked down portions of the leaves, as will be apparent from the following. A rectangular axial slot 50a is then cut into the inside wall of the cylinder from the top thereof, which slot extends parallel to the axis Z–Z. The depth in which the slot extends into the wall is regulated so that the remaining wall thickness corresponds to the desired width of the outer axial flexure leaf 22. The width of the slot 50 is approximately the same as the diameter of each of the two adjacent drilled holes 40 and 42, and the length of the slot is sufficient to remove the thin web between these latter holes in the inside portion of the wall.

A similar slot 50b (FIG. 2 only) is then cut into the inside wall from the bottom of the cylinder 10 and cuts through the thin web between the holes 44 and 46 in the inside portion of the wall. The slots 50a and 50b terminate a spaced distance from each other to form the flexure leaf 24. The leaf 24 thus has a thickness corresponding to the distance between the ends of the slots 50a and 50b, a width corresponding to the width of the slots. The thickness of the necked down portions 24a and 24b of the leaf 24 corresponds to the distance between the holes 40 and 44, and between the holes 42 and 46.

Two additional slots 52a and 52b are then cut into the outside of the cylinder 10 parallel to the flexure axis Y-Y to form the flexure leaf 22, as shown in FIG. 1. These slots are cut from two directions toward the leaf 22, and are of a sufficient length to remove the thin web between the holes 42 and 46 and between the holes 40 and 44 in the outside portion of the wall, to thus form the leaf 22 between the ends of the slots. The widths of the slots are approximately the same as the diameter of each of the holes 42 and 46, or the holes 40 and 44, and their depth is such that the resulting wall thickness between the end of the slots and the inside of the cylinder is the same as the desired width of the inner leaf 24. The leaf 22 thus has a thickness corresponding to the distance between the ends of the slots 52a and 52b, a width corresponding to the depth of the slots, and a length corresponding to the width of the slots.

It is emphasized that in cutting any of the above slots 50a, 50b, or 52a, 52b, the cutting tool is shaped so that at least a portion of it cuts between the inner and outer leaves 22 and 24 to separate them. Thus the combined thickness of the two flexure leaves of each flexure portion is slightly less than the thickness of the wall of the cylinder 10.

The remaining flexure leaves are formed in an identical manner and it is emphasized that the holes forming the necked down portions of the leaves 26 and 28 can be drilled at the same time as the holes 40, 42, 44 and 46, while the holes forming the necked down portions of the leaves 34 and 36 can be drilled at the same time as the holes forming the necked down portions of the leaves 32 and 30.

The hollow cylinder 10 can be formed of any type of suitable material, such as maraging steel or beryllium copper, and, preferably the cutting is effected by electrodischarge machining using a spark erosion technique, as is well known in the art.

It is understood that the flexure joint thus formed can be formed integral with the two members which it connects, or it can be connected between them in any known manner.

The advantages of the flexure joint of the present invention are many. First of all, the flexure provides two-axis torsional and axial flexure utilizing only one basic piece, which considerably lowers the manufacturing cost through reduction of the machining and assembly operations. Also, due to the one piece construction, less damage is likely to occur. Further, better alignment of the flexure axis is achieved since the alignment is derived from a machine tool which fabricates the structure, and not from an assembly tool which requires tolerances and causes errors to accumulate.

It is emphasized that the use of two pairs of slots and the four sets of flexure leaves are not limitative but are described only by means of example, and that the flexure joint is not limited to use in gyroscopes, but may be used in any environment in which a precise universal joint connection is required.

Of course, other variations of the specific construction and arrangement of the flexure joint disclosed above can be made by those skilled in the art without departing from the invention as defined in the appended claims.

I claim:

1. A flexure joint comprising a unitary hollow cylindrical member having at least one pair of slots extending through the wall thereof, the ends of one slot of each pair terminating a predetermined circumferential distance from the corresponding ends of the other slot of the same pair to form at least two flexure portions between the corresponding ends, each flexure portion being formed of two flexure leaves, with the longitudinal axis of one flexure leaf of each flexure portion extending parallel to the axis of said cylindrical member, and the longitudinal axis of the other flexure leaf of each flexure portion extending perpendicular to the axis of said cylindrical member, each flexure leaf having two necked down portions connected in series, said flexure portions permitting relative flexing of at least one portion of said cylindrical member relative to at least one other portion thereof.

2. The flexure joint of claim 1 wherein each of said necked down portions has two curved surfaces formed by drilling two bores through said cylindrical member.

3. A flexure joint comprising a unitary hollow cylindrical member formed into at least two gimbal portions and at least two flexure portions connecting two adjacent gimbal portions to permit relative flexing between said adjacent gimbal portions, each flexure portion being formed of two flexure leaves, with the longitudinal axis of one flexure leaf of each flexure portion extending parallel to the axis of said cylindrical member, and the longitudinal axis of the other flexure leaf of each flexure portion extending perpendicular to the axis of said cylindrical member, each flexure leaf having two necked down portions connected in series.

4. The flexure joint of claim 3 wherein each of said necked down portions has two curved surfaces formed by drilling two bores through said cylindrical member.